United States Patent [19]

Boyd

[11] E Patent Number: Re. 33,150

[45] Reissued Date of Patent: Jan. 23, 1990

[54] BOREHOLE DRILL PIPE CONTINUOUS SIDE ENTRY OR EXIT APPARATUS AND METHOD

[75] Inventor: Harper Boyd, Lake Charles, La.

[73] Assignee: Boyd's Bit Service Inc., Lake Charles, La.

[21] Appl. No.: 381,027

[22] Filed: Jul. 17, 1989

Related U.S. Patent Documents

Reissue of:

[64] Patent No.: 4,681,162
Issued: Jul. 21, 1987
Appl. No.: 830,824
Filed: Feb. 19, 1986

[51] Int. Cl.[4] ..... E21B 17/00; E21B 19/08
[52] U.S. Cl. ..... 166/242
[58] Field of Search ..... 166/65.1, 69, 76, 77, 166/93, 99, 117.5, 242, 301, 377–379, 385

[56] References Cited

U.S. PATENT DOCUMENTS

| | | | |
|---|---|---|---|
| 4,062,551 | 12/1977 | Base | 166/242 X |
| 4,200,297 | 4/1980 | Tricon | 277/102 |
| 4,388,969 | 6/1983 | Marshall et al. | 166/242 |
| 4,399,877 | 8/1983 | Jackson et al. | 175/45 |
| 4,506,729 | 3/1985 | Davis, Jr. et al. | 166/65.1 |
| 4,524,834 | 6/1985 | Barron et al. | 166/385 |

*Primary Examiner*—Thuy M. Bui
*Attorney, Agent, or Firm*—Pravel, Gambrell, Hewitt, Kimball & Krieger

[57] ABSTRACT

A side entry sub for use in a drill pipe string which permits continuous injection and/or removal of a wireline equipped with analitical instruments within the hollow of the pipe without interrupting the connection or resulting communication between the wireline and tool apparatus. The operation is performed with the top power device connected to the drill pipe string and may be used during pressure application of drilling mud. Such a device permits location of a stuck pipe without disassembly of the top power drive.

7 Claims, 2 Drawing Sheets

BOREHOLE DRILL PIPE CONTINUOUS SIDE ENTRY OR EXIT APPARATUS AND METHOD

Matter enclosed in heavy brackets [ ] appears in the original patent but forms no part of this reissue specification; matter printed in italics indicates the additions made by reissue.

This invention relates to a side entry apparatus for use in an oil well drilling string which permits a continuous insertion or removal of a wireline equipped with desirous apparatus for uninterrupted communicating from above the surface with the inside of the drill pipe string.

Heretofore various types of side entry apparatus have been used with a drill pipe string in which a wireline has been passed through a side entry and fixed within the side entry against movement within the side entry. Such side entry subs are usually assembled within the pipe string near the drill motor with additional pipe added above the side entry sub as the well bore is drilled. Such devices have been set forth in U.S. Pat. Nos. 4,062,551; 4,200,297; 4,388,969 and 4,506,729. U.S. Pat. No. 4,399,877 sets forth a side entry sub which is assembled in the drill pipe string above the ground surfaces for continuously surveying a borehole drilled substantially horizontally throughout its length. The pipe is provided with cable and cable holders so that as each section of pipe is added the side entry sub may be used to connect an exterior cable with the interior cable.

It is common practice in borehole drilling to use a VARCO type top drive drilling motor which is mounted on guide rails in a drilling rig device. This allows a suspension block assembly to be raised and lowered thus moving the drill string in the borehole which permits adding pipe as needed. When this type of drilling assembly is utilized and the drill pipe becomes stuck in the borehole and cannot be moved, then the top drive drilling motor must be diassembled and removed from above the stuck drill pipe. Such a procedure requires about eight (8) hours disassembly time. After removal of the top drive drilling motor, a surface concentrically oriented pack-off assembly is secured to the top of the drill pipe and utilized for entry into the drill string with an electrical wireline to determine at which depth the sticking problem has occurred. The longer the time of determining the problem, analyzing the requirements and taking corrective action, the less chance there will be of freeing the stuck drill string. A secondary consideration is the economics involved with the operation of this type drilling rig. The offshore drilling rigs often cost approximately $50,000 per day or about $2,000 per hour. The time to remove a top mounted drive assembly would cost approximately $16,000. An approximate equal amount of time to reassemble the unit would result in a total expense of some $32,000 not counting the time required to solve the problem. It is hereby shown that time is important and it is therefore desireable to remove the problem and to start drilling as fast as possible.

It is therefore an object of this invention to provide a side entry sub which may be placed into the drill pipe string without disassembly of the top mounted drive assembly.

Another object is to provide a side entry sub which permits a continuous injection and removal of a wireline equipped with various tool apparatus into the drill pipe string from above the surface during movement of the pipe.

Still another object is to provide a side entry sub which may be placed in betwen two sections of drill pipe above the surface which permits insertion of analitical instruments into the drill pipe string for manipulation of the instrument under pressure as well manipulation of the drill pipe in a procedure to free the stuck drill pipe.

DETAILED DESCRIPTION

Figure 1:
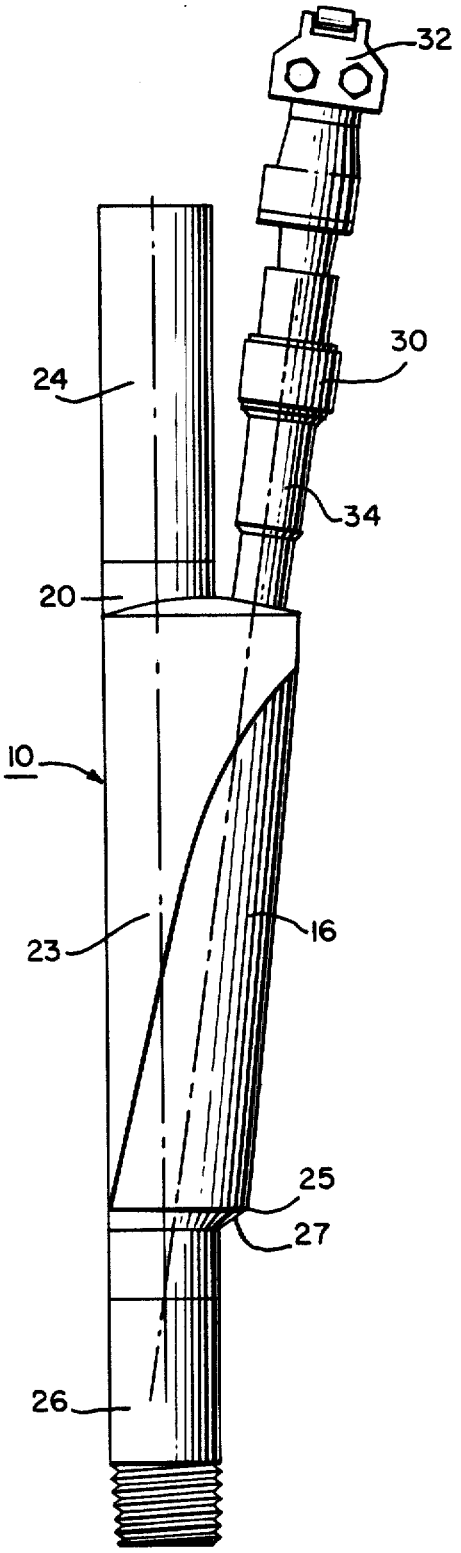
FIG. 1 is a side view of a side entry sub made in accordance to this invention.
Figure 2:
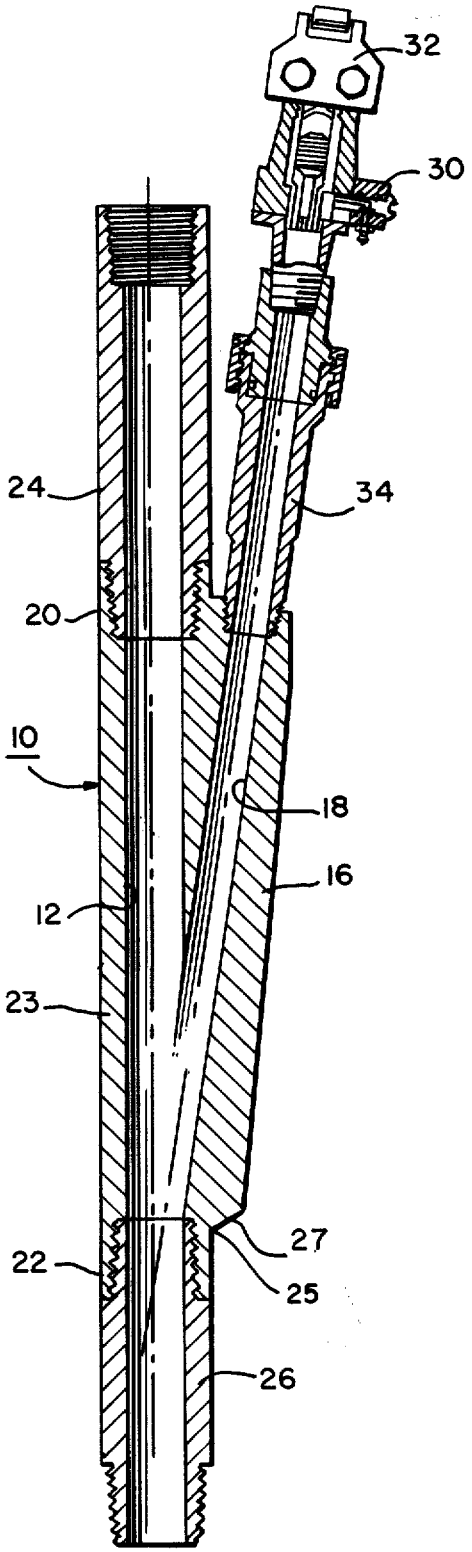
FIG. 2 is a cross sectional view of FIG. 1.

As shown in the drawings, the side entry sub 10 includes a cylindrical main section having an inside diameter passage 12 which is drilled off-center of the main section and which is the same as the inside diameter of a 4½ inch outside diameter pipe 14 used in a drill pipe string with the passage through the main section in axial alignment with the pipe sections on either end of the side entry sub. A side entry section 16 is drilled with a two (2) inch inside diameter passage 18 with the axis of the passage at a 6½ degree angle relative to the passage 12 through the main section. The side entry sub may be made from one cylindrical piece of steel or any other suitable material having an outside diameter of approximately 10¼ inches. The upper and lower ends 20 and 22 of the side entry sub are milled to have the same outside diameter as the drill pipe and are threaded on their inside to receive threaded end pipe sections. The central section 23 which includes the side entry section 16 is tapered along the passage 18 from the top to within five inches from the bottom to have a six (6) inch outside diameter at 25, five (5) inches up from the bottom. The bottom then tapers at 27 over 1⅛ inches to the normal outside diameter of the end 22. A 19⅝ inch, short section 24 having male and female threaded ends is added at the top and a 17 6/8 inch, short section 26 having male threaded ends is added to the bottom end. The bottom short section 24 may be changed end-for-end for longer wear because the greatest amount of wear is at the upper end where the wireline drags the most.

A prior art hydraulic pressure pack-off assembly 30 made by Belt Rubber Company, Kennedale, Tex., which in normal use is secured to the top of the drill pipe string for determining the stuck position of the drill pipe line, is modified to be used with the side entry sub. The upper end of the hydraulic pressure pack-off assembly is modified at the upper end to include a wireline guide 32 to prevent wear on the upper end of the assembly 30 and an appropriate fitting 34 is connected between the pack-off assembly and the side entry.

In normal well drilling, a VARCO top power drive 34 is guided on guide rails (not shown) during drilling and as the hole is drilled the power drive is lowered along the rails. After ninety feet has been drilled the VARCO top power drive is raised and a new section of ninety foot pipe is added to the drill pipe string. If the pipe becomes stuck, then means must be provided for determining the location of the stuck pipe. Since there is insufficient room between the drill pipe elevators and the VARCO drive unit to pass a wireline through a hydraulic pressure pack-off added to the upper end of the pipe, usually the VARCO drive unit must be disassembled. As set forth earlier this takes considerable time which may result in a permanently stuck pipe. To avoid disassembly of the power drive unit the side entry sub 10 of this invention is used.

Figure 3:
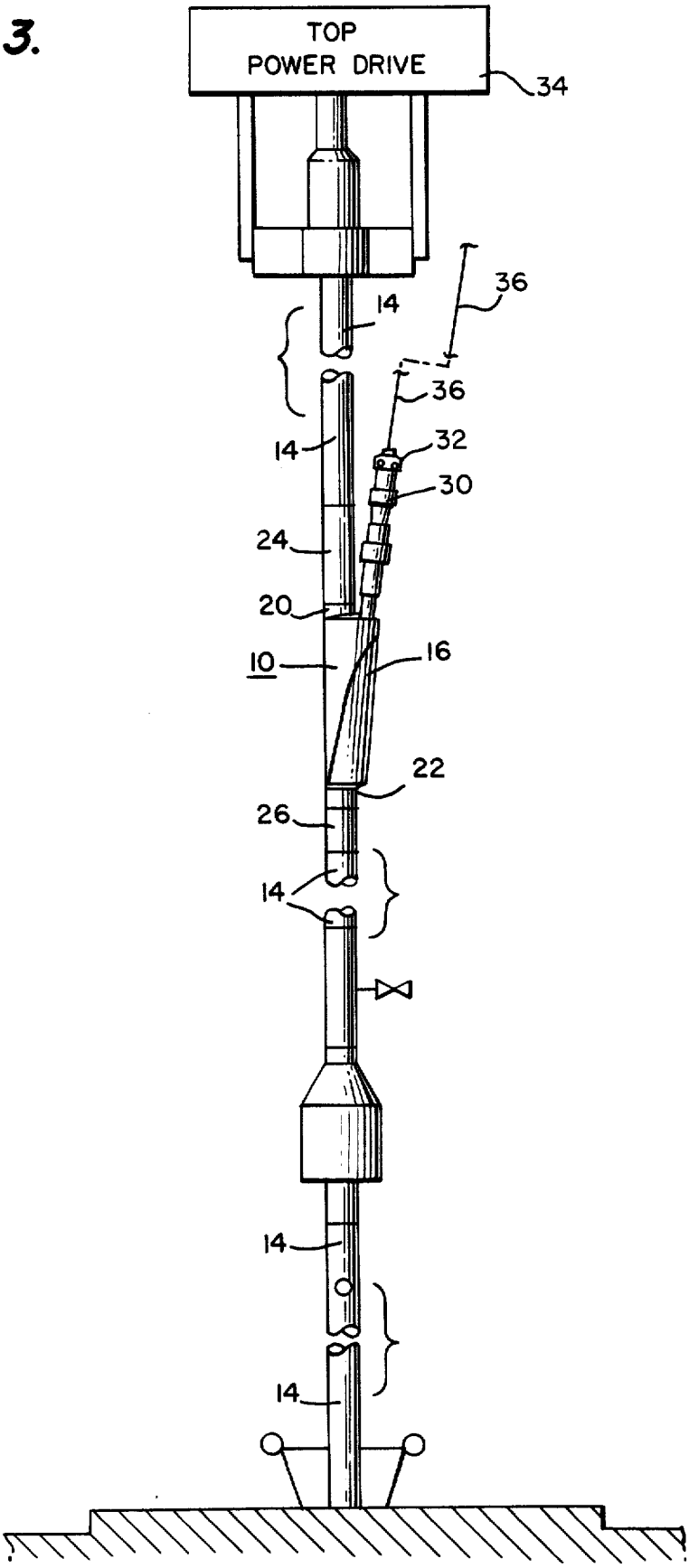
FIG. 3 illustrates the side entry sub assembled in a drill pipe string for its intended use. The drill pipe has been cut to shorten the assembly.

In use, the first thirty foot section of the drill pipe string is unthreaded from the second thirty foot section and the side entry sub is assembled between the first section of thirty foot pipe and the second section of thirty foot pipe, as shown in FIG. 3. Once the side entry sub has been assembled between the end of the first drill pipe section and the second drill pipe section, the elecrical wireline unit including electric conductor line 36 is installed in the derrick in the usual manner for end-pipe operation. After the wireline unit is installed in the derrick, a wireline rope socket and analitical instruments such as a DIA-LOG free point indicator manufactured by the Dia-Log Company is property attached to the electrical wireline and inserted through the hydraulic pressure pack-off unit 30 into the drill pipe through the side entry sub 10. Since the VARCO drive unit 34 is secured to the upper end of the first section of pipe and the wireline and analitical instruments are inserted into the pipe through the side entry sub, the wireline tools and VARCO drive unit can be manipulated under pressure using the drilling mud in a procedure to free the stuck drill pipe.

By use of the side entry sub, the VARCO power drive can be used to manipulate the pipe string during the time used to free the pipe. Once the pipe has become free, the wireline and instruments are removed from the side entry sub. The side entry sub is then removed and the drill pipe string is reconnected in the usual manner for drilling. The only down time is the time required to insert the side entry sub wireline, free the pipe and then remove the wireline, etc., and side entry sub. In practice, it takes about ½ hour to insert the side entry sub, and about the same time to remove the side entry sub. Once the side entry sub has been removed, the drill pipe can be pulled from the borehole without having had to disassemble the VARCO drive motor assembly.

The side entry sub permits a wireline operation to be performed with the drill pipe under pressure and also reduces the down time since the power drive motor assembly does not have to be disassembled and reassembled.

Additionally FIG. 3 illustrates the usual assembly including the known elements, as shown. It will be obvious to one skilled in the art that in order to protect the threads on the ends of the short end pipe section of the side entry sub when not in use that caps may be threaded onto the ends. Such caps may be provided with a U-shaped catch such as a semicircular rod-loop secured to the cap wich may be used in conjunction with a hook for lifting the device into place.

The foregoing relates to a preferred exemplary embodiments of the invention, it being understood that other variants and embodiments thereof are possible within the spirit and scope of the invention, the latter being defined by the appended claims.

What is claimed and desired to be secured by Letters Patent of the United States is:

1. A side entry sub for use in combination with a hydraulic pressure pack-off assembly for freeing a stuck drill pipe of a drill pipe string without disassembly of a top drive drilling motor assembly which comprises:

a main body section;

a main passage through said main body section off-center with respect to the center line of said main body section and of the same diameter as the inside diameter of said drill pipe; said main passage having upper and lower ends, said upper and lower ends provided with internal female pipe threads, a side entry passage in said main body section which intercepts said main passage and extends in the same direction as said main passage at an angle of about 6½ degrees relative to said main passage and of a smaller diameter than said main passage, said side entry passage having an outer end with internal female pipe threads, a short pipe section having a length of from about 17 inches to about 20 inches secured to each pipe threaded end of said main passage in said main body section in which said short pipe section includes pipe threads on the outer surface of each end to assume a greater amount of wear during use than said main body section and which is replaceable when worn, and an adapter having male pipe threads on its outer end surfaces secured to said side entry passage and to which said hydraulic pressure pack-off assembly is secured.

*2. A side entry sub for use in combination with a hydraulic pressure pack-off assembly for freeing a stuck drill pipe of a drill pipe string without disassembly of a top drive drilling motor assembly which comprises:*

*(a) a main body section;*

*(b) a main passage through said main body section off-center with respect to the center line of said main body section and of the same diameter as the inside diameter of said drill pipe; said main passage having upper and lower threaded ends, at least said lower end provided with internal female pipe threads;*

*(c) a side entry passage in said main body section which intercepts said main passage and extends in the same direction as said main passage at an angle of about 6½ degrees relative to said main passage and of a smaller diameter than said main passage, said side passage having an outer end with internal femal pipe threads;*

*(d) a short pipe section secured to the lower threaded end of said main passage in said main body section in which said short pipe section includes pipe threads on the outer surface of its upper end to assume a greater amount of wear on the threaded end of the short pipe section as the wireline is moved between the side entry passage and the main passage, the short pipe section replaceable when worn.*

*3. A side entry sub for use in combination with a hydraulic pressure pack-off assembly for freeing a stuck drill pipe of a drill pipe string without disassembly of a top drive drilling motor assembly which comprises:*

*(a) a main body section;*

*(b) a main passage through said main body section off-center with respect to the center line of said main body section and of the same diameter as the inside diameter of said drill pipe; said main passage having upper and lower ends, said upper and lower ends provided with internal female pipe threads;*

*(c) a side entry passage in said main body section which intercepts said main passage and extends in the same direction as said main passage at an angle of about 6½ degrees relative to said main passage and of a smaller diameter than said main passage, said side passage having an outer end with internal female pipe threads; and*

*(d) a short pipe section secured to at least the lower threaded end of said main passage in said main body section in which said short pipe section includes the pipe threads on the outer surface on each end to assume a greater amount of wear during use in the main body section when the wireline is pulled between the side entry passage and the main passage and which is replaceable and reversible when worn.*

*4. The apparatus in claim 3, further including an adapter having a male pipe threads on its outer end surfaces secured to the side entry passage into which said hydraulic pressure pack-off assembly is secured.*

*5. The apparatus in claim 3, wherein the main body section may further include a portion extending above the entry of the side entry passageway in the main body section so as to allow a portion to be grasped with tongs when the side entry sub is secured to a drill string.*

*6. The apparatus in claim 3, wherein the short pipe section has a length from about 17 inches to about 20 inches.*

*7. The apparatus in claim 3, wherein the short pipe section would include pipe threads on the outer surface of each end so as to allow the short pipe section to be reversed when one of the ends is worn by the movement of the wireline therethrough.*

* * * * *